Patented Sept. 17, 1935

2,014,720

UNITED STATES PATENT OFFICE 2,014,720

DEVITALIZATION OF PATHOGENIC MICRO-ORGANISMS

Walter G. Christiansen, Bloomfield, N. J., and Eugene Moness, Far Rockaway, and Sidney E. Harris, Brooklyn, N. Y., assignors to E. R. Squibb & Sons, New York, N. Y., a corporation of New York No Drawing. Application May 19, 1931, Serial No. 538,620

14 Claims. (Cl. 167—31)

This invention relates to, and has for its object the provision of substances and methods for, the devitalization of pathogenic micro-organisms. Herein to devitalize means to destroy, to inhibit the growth of, or to render harmless.

We have found that pathogenic micro-organisms may be efficiently devitalized by applying to them compositions including compounds of the general formula

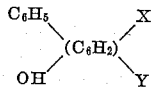

wherein X represents an alkyl, an alkylene, a halogen, a hydroxyl, or a thiocyano group, and Y represents hydrogen, an alkyl, an alkylene, a halogen, or a thiocyano group; and that the activity of our compositions may be intensified by the addition of a small proportion of an acid—preferably, for ordinary purposes, in such concentration as to give a pH of between 3 and 4. Our compositions may comprise these compounds, with or without the acid, alone or in suitable vehicles, especially hydro-alcoholic solutions and aqueous dilutions thereof.

Among the compounds whose effectiveness in the devitalization of pathogenic micro-organisms we have demonstrated are: 2-hydroxy 5-ethyl diphenyl, 2-hydroxy 3-n-propyl diphenyl, 2-hydroxy 5-n-propyl diphenyl, 2-hydroxy 3-n-butyl diphenyl, 2-hydroxy 5-n-butyl diphenyl, 2-hydroxy 3-n-amyl diphenyl, 2-hydroxy 5-n-amyl diphenyl, 2-hydroxy 3-allyl diphenyl, 2-hydroxy 3-bromo 5-n-propyl diphenyl, 2-hydroxy 3-n-amyl 5-bromo diphenyl, 2-hydroxy 3-bromo diphenyl, 2-hydroxy 5-bromo diphenyl, 2-hydroxy 3-chloro diphenyl, 2-hydroxy 5-chloro diphenyl, 2-hydroxy 3,5-dichloro diphenyl, 2-hydroxy 5-thiocyano diphenyl, 3-allyl 4-hydroxy diphenyl, 3-n-propenyl 4-hydroxy diphenyl, 2,4-dihydroxy diphenyl, and 2,5-dihydroxy diphenyl.

For example, solutions containing .25% of our compounds with 25% of alcohol, 35% of glycerin, and 39.75% of water, are powerful germicides. Below are indicated (by their reciprocals) concentrations of our compounds, submultiples of .25%, obtained from some such solutions by dilution with water, that cause the destruction, in 5-minute and 10-minute periods respectively, of the pathogenic micro-organisms specified.

*Bacterium typhosum*

| | | |
|---|---:|---:|
| 2-hydroxy 5-ethyl diphenyl | 1,600 | 4,000 |
| 2-hydroxy 5-n-amyl dipheny | 4,000 | ---- |
| 2-hydroxy 3-allyl diphenyl | ---- | 1,200 |
| 2-hydroxy 5-bromo diphenyl | 20,000 | ---- |
| 2-hydroxy 3-chloro diphenyl | 8,000 | 12,000 |
| 2-hydroxy 5-thiocyano diphenyl | 4,000 | ---- |

*Staphylococcus aureus*

| | | |
|---|---:|---:|
| 2-hydroxy 5-ethyl diphenyl | 4,000 | 10,000 |
| 2-hydroxy 5-n-propyl diphenyl | 20,000 | ---- |
| 2-hydroxy 5-n-butyl diphenyl | 2,000 | ---- |
| 2-hydroxy 5-n-amyl diphenyl | 1,200 | 1,600 |
| 2-hydroxy 3-chloro diphenyl | 4,000 | ---- |
| 3-allyl 4-hydroxy diphenyl | 10,000 | 20,000 |
| 3-n-propenyl 4-hydroxy diphenyl | ---- | 1,200 |

As an example of the intensified activity resulting from the addition of an acid, a solution containing .1% of 2-hydroxy 5-n-propyl diphenyl and N/50 with respect to acetic acid, kills *Staphylococus aureus* in five minutes even when the concentration of 2-hydroxy 5-n-propyl diphenyl has been reduced by dilution with water to .002%.

Obviously our compositions may be prepared in great diversity as to vehicles and proportions, for adaptation to particular purposes; and are endowable with desired colors, odors, and flavors by known means. Aqueous dilutions required may be made at the time of use.

Below are given four exemplificative formulas. Water is the complementary ingredient in each.

I

| | Percent |
|---|---:|
| 2-hydroxy 5-n-propyl diphenyl | .04 |
| Alcohol | 25 |
| Boric acid | 2.5 |
| Sodium benzoate | .6 |
| Sodium salicylate | .12 |

II

| | Percent |
|---|---:|
| 2-hydroxy 5-n-propyl diphenyl | .1 |
| Alcohol | 25 |
| Glycerin | 35 |

III

| | Percent |
|---|---:|
| 2-hydroxy 5-bromo diphenyl | .05 |
| Alcohol | 25 |
| Glycerin | 35 |

IV

| | Percent |
|---|---|
| 2-hydroxy 3-chloro diphenyl | 6 |
| Alcohol | 16 |
| Linseed oil soap | 6.2 |
| Coconut oil soap | 6.2 |
| Potassium hydroxide | .1 |

It is to be understood that the foregoing embodiments are merely illustrative and by no means limitative of our invention, which may assume various forms—for example, as to the particular compounds, acids, and vehicles employed and their respective proportions—within the scope of the appended claims.

We claim:

1. In a composition for devitalizing pathogenic micro-organisms, a compound of the general formula

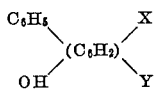

wherein X represents an alkyl, an alkylene, a halogen, a hydroxyl, or a thiocyano group and Y represents hydrogen or a halogen.

2. In a composition for devitalizing pathogenic micro-organisms, a compound of the general formula

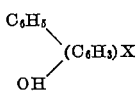

wherein X represents an alkyl.

3. In a composition for devitalizing pathogenic micro-organisms, 2-hydroxy 5-n-propyl diphenyl.

4. In a composition for devitalizing pathogenic micro-organisms, a compound of the general formula

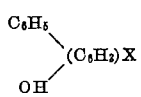

wherein X represents a halogen.

5. In a composition for devitalizing pathogenic micro-organisms, 2-hydroxy 3-chloro diphenyl.

6. In a composition for devitalizing pathogenic micro-organisms, dihydroxy diphenyl.

7. In a composition for devitalizing pathogenic micro-organisms, a compound of the general formula

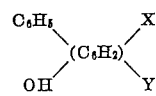

wherein X represents an alkyl, an alkylene, a halogen, a hydroxyl, or a thiocyano group and Y represents hydrogen or a halogen and a small proportion of an acid.

8. In a composition for devitalizing pathogenic micro-organisms, 2-hydroxy 3-chloro diphenyl and a small proportion of an acid.

9. In a composition for devitalizing pathogenic micro-organisms, 2-hydroxy 3-chloro diphenyl and a small proportion of acetic acid.

10. Devitalizing pathogenic micro-organisms by applying to them a composition including a compound of the general formula

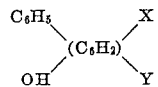

wherein X represents an alkyl, an alkylene, a halogen, a hydroxyl, or a thiocyano group and Y represents hydrogen or a halogen.

11. Devitalizing pathogenic micro-organisms by applying to them a composition including a compound of the general formula

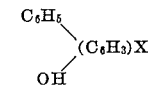

wherein X represents a halogen.

12. Devitalizing pathogenic micro-organisms by applying to them a composition including 2-hydroxy 3-chloro diphenyl.

13. A germicidal and antiseptic composition comprising a mono-chloro-ortho phenylphenol.

14. A germicidal and antiseptic composition comprising an aqueous solution of mono-chloro-ortho phenylphenol.

WALTER G. CHRISTIANSEN.
EUGENE MONESS.
SIDNEY E. HARRIS.